Sept. 30, 1969     N. D. FRAILLY     3,469,494
INTERNAL RETAINING RING
Filed Dec. 12, 1966

INVENTOR
NICHOLAS D. FRAILLY

BY Teagno & Taddy

ATTORNEYS

United States Patent Office 3,469,494
Patented Sept. 30, 1969

3,469,494
INTERNAL RETAINING RING
Nicholas D. Frailly, Massillon, Ohio, assignor to Eaton Yale & Towne Inc., Cleveland, Ohio, a corporation of Ohio
Filed Dec. 12, 1966, Ser. No. 600,974
Int. Cl. F16b 21/00
U.S. Cl. 85—8.8                                    5 Claims

ABSTRACT OF THE DISCLOSURE

A retaining ring of uniform cross-section for insertion into a groove within a bore for axial placement or retention of a workpiece within the bore. The ring having an elliptical free configuration for obtaining ring circularity less than bore diameter when the ring is compressed for insertion into the bore and further having notches near the free ends of the ring for ring tool reception.

---

This invention relates to improvements in split internal retaining rings and more specifically to improved uniform section retaining rings which are adapted to secure structures or parts such as bearings, gears, and the like, against axial displacement in the bore of a housing.

In previous well-known retaining ring constructions, the following basic configurations have been employed:

One widely known conventional type of circular retaining ring is formed with a substantially uniform section wherein both the radial width and axial thickness are uniform throughout its entire arcuate extent and with an outer peripheral surface which is formed on a radius which is approximately equal to the radius of the base wall of the seating groove in which the ring is designed to be inserted. In this type of construction, the ring seats against the bottom or base wall of the groove without exerting a substantial force thereagainst. One inherent disadvantage of this circular uniform section type of ring is that upon bringing the spaced ends together, preparatory to insertion of the ring in a complementary seating groove, an oval deformation occurs which results in difficulties in assembly as the ring must be misaligned relative to the housing bore in order to insert the ring therein. Likewise, this oval deformation of the uniform section creates very high stresses in the ring which are detrimental thereto.

Another conventional type of ring discloses a configuration having tapered end sections with a radial thickness which decreases symmetrically from the center to the free end portions thereof, whereby the ring will remain in a substantially circular configuration as the free end portions are forced together. This type of ring when released will provide a high thrust load upon the base wall of the seating groove. These tapered rings are stamped from sheet metal and as a result of this stamping action, varying radii are generally formed on the inner and outer edges of at least one surface of the ring. Thus, if these irregularly rounded edges are positioned against a lateral thrust receiving wall of the seating groove opposite a thrust piece, any dynamic thrust exerted on the ring is translated to these irregularly rounded corners in contact with the thrust receiving lateral wall portion of the seating groove and may result in a reduced amount of thrust capacity.

In addition, this type of retaining ring because of the tapered construction, extends or protrudes an unequal radial distance into the bore of the housing and thus creates an artificial retaining shoulder of non-uniform depth.

An object of applicant's invention is to provide a new and improved retaining ring with a generally uniform section substantially throughout its entire arcuate extent and in which the upper or split portion of the ring has a greater curvature about the true center point of the ring than the curvature of the lower portion of the ring.

A further object is to provide a new uniform section retaining ring in which the upper or split portion comprises two spaced apart curved end members each of which has a radius of curvature which is smaller than the radius of the remaining portion of the ring, whereby the ring is deformed into a nearly circular configuration when the two spaced apart members, which form the upper portion, are forced together preparatory to insertion of the ring in the seating groove of a housing bore and where the compressed diameter of the ring is less than the diameter of the bore to prevent scoring of the bore during assembly of the ring. When compressed, the diameter of the circle formed by the outer peripheral surface of applicant's retaining ring is smaller than the housing bore and upon release of the ring, when positioned opposite the seating groove, the ring will expand outwardly into intimate contact with the base wall and/or bearing race of the seating groove and exert a force thereagainst throughout a large portion of the circumferential extent thereof.

Another object of the present invention is to provide a uniform section retaining ring wherein the two spaced apart members forming the upper or split portion have the configuration of a spiral having a center coinciding with the true center of the ring.

A further object is to provide a new uniform section, split, retaining ring wherein the end members thereof are each formed with a lesser radius of curvature than the remaining ring segment and provided near their free extremities with slots to facilitate gripping of the ring for placement and removal thereof.

The uniform section ring of the present inventive concept has numerous advantages over the prior art rings, some of which are enumerated below:

(1) No projections which could interfere with mating parts, (2) Axial thrust loading is absorbed by the full ring face and distributed evenly against the groove shoulder, and (3) Equal corner radii eliminates any need to orient the ring face in assembly.

The present invention provides an improved retaining ring which possesses the combined advantages of both the tapered and the prior art uniform section rings as previously noted. More specifically, the present invention contemplates a new and unobvious retaining ring having an outer peripheral surface exerting a tight pressure fit against the base wall of a complimentary seating groove throughout a large portion of its arcuate extent; while providing a wall of uniform radial distance for contacting a lateral wall of the seating groove and maintaining uniform circularity such that when the ring is operatively disposed within the seating groove, the ring will radially extend a substantially constant predetermined distance into the bore, thus providing a uniform shoulder and/or a bearing surface extending substantially throughout the arcuate extent of the ring. Accordingly, the present invention contemplates having the true center of the retaining ring, when operatively disposed in the seating groove, substantially coinciding with the center of the housing bore, so that the inner edge of the ring generally extends into the bore a substantially equal distance.

A better understanding of the invention will be afforded by the following detailed description considered in conjunction with the drawing in which.

Figure 1:
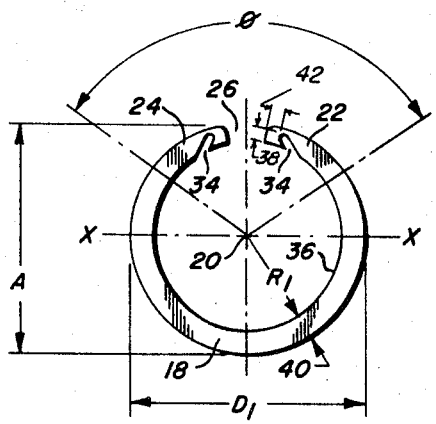
FIGURE 1 is a diagrammatic view illustrating one embodiment of the present invention in an unrestrained position.

Referring to FIGURES 1–5 of the drawing, more in detail wherein like numerals have been utilized to denote similar parts throughout, there is disclosed in FIGURE 1 an internal noncircular retaining ring 10 composed of a suitable material, such as carbon steel, or some similar material of sufficient strength to provide an artificial shoulder for locating or preventing axial movement of a machine part, bearing, or other structure in an internal bore 12 of housing 14. The retaining ring 10 is used in combination with a seating groove 16 positioned within housing bore 12.

The ring 10 of FIGURE 1 has a lower or intermediate portion 18 having a generally circular configuration formed by radius $R_1$ and extending a predetermined arcuate distance about the true center 20. The upper portion of ring 10 is split to define opposed members 22 and 24 in spaced relationship defining a free gap 26. The curvature, relative to the true center 20 of the members 22 and 24 defined by the arc $\theta$ is greater than the curvature of intermediate portion 18 such that deflection of members 22 and 24 toward each other results in an elastic deformation of the outer peripheral surface 32 into a circle having an outer diameter $D_2$ which is less than the diameter $D_3$ of housing bore 12, when the members 22 and 24 are forced together, whereby the ring 10 may be easily inserted into housing bore 12 and opposite groove 16 having an outer diameter $D_4$.

Figure 2:
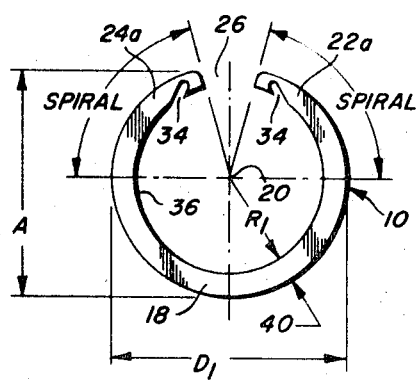
FIGURE 2 is a diagrammatic view of another embodiment of the present invention, in an unrestrained configuration.
Figure 3:
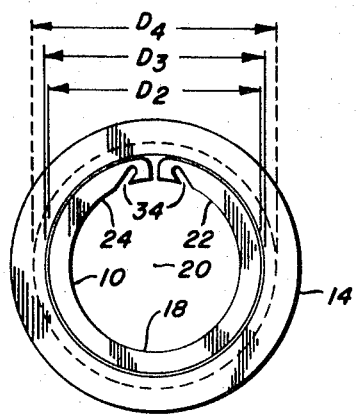
FIGURE 3 shows the ring of the present invention after it has been compressed for insertion in a housing bore.
Figure 5:
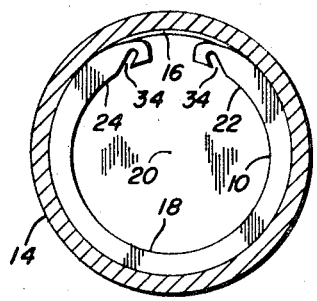
FIGURE 5 is a section taken along line 5—5 of FIGURE 4.
Figure 4:
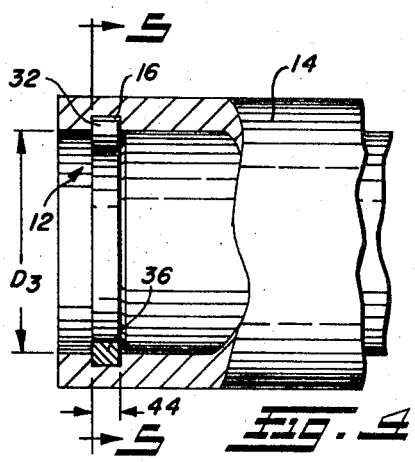
FIGURE 4 is a cross-sectional view of a housing bore showing the internal ring operatively disposed within the seating groove.

It is possible to form the end portions 22 and 24 with a greater curvature in various ways, such as, bending the end portions 22 and 24 from a circle towards the geometric center of the ring; forming the end portions 22 and 24 with a lesser radius than $R_1$; or with a spiral as shown in FIGURE 2. The important feature is, however, that in an unrestrained state dimension A be less than $D_1$ such that the ring 10 has a free state noncircular configuration. Circularity is obtained by compressing the end portions 22 and 24 towards each other. When so compressed, the ring 10 is designed to be generally circular with a diameter less than the diameter of the bore into which the ring is to be inserted, as is shown in FIGURE 3.

The relationships for the respective dimensions of the retaining ring 10, housing bore 12, and seating groove 16 may be illustrated in a general manner as follows:

$D_1$ is greater than A
$D_1$ is greater than $D_4$
$D_3$ is less than $D_4$
$D_3$ is greater than $D_2$ Wherein:

$D_1$ is the largest outer dimension of the ring 10 in a free of unrestrained state;

$D_2$ is the compressed or reduced outer diameter of the ring 10 which results in forcing members 22 and 24 together;

$D_3$ is the diameter of the housing bore 12; and $D_4$ is the outer diameter of seating groove 16 adapted to receive ring 10.

A is the height of the ring measured from the center of intermediate ring portion 18 to the tip of end portions 22 and 24.

Accordingly, as the two members 22 and 24 are forced together the ring 10 forms a circle having an outer diameter $D_2$ which is slightly less than diameter $D_3$ of housing bore 12. The stress created in the ring 10 by bringing the two end portions together is of sufficient magnitude to exceed the elastic limit of the ring material and a very slight permanent set is exhibited by the ring 10. However, the ring 10 is designed such that the outer dimension $D_1$ of the ring in a free or unrestrained state will spring back in excess of groove diameter $D_4$ after being compressed to pass through bore 12. Accordingly, the ring upon being released will expand into seating groove 16 and exert a radial force upon the base wall thereof.

By providing the upper portion of the ring 10 with a greater curvature, relative to the true center 20, than the semicircular lower portion less free gap is required between members 22 and 24 as diameter $D_1$ does not have to close as much as a ring of circular design to assemble the ring and the amount of ring deformation and accompanying permanent set is substantially reduced. Thus, by utilizing the ring configuration of the present invention the advantages of both the conventional circular uniform section ring and the conventional tapered ring are incorporated therein.

The slots 34 positioned on the inner side 36 of ring 10 are adapted to receive a tool for forcing the members 22 and 24 together for operatively positioning and/or removing ring 10 relative to seating groove 16. The slots 34 should have a radial width 38 approximately one-half the radial width 40 of ring 10, or of sufficient depth to prevent pliers from slipping off. The closed end of each slot 34 being spaced from the free edge of ring 10 an arcuate distance 42 which is equal to at least the axial thickness 44 (see FIGURE 5) of ring 10.

Slots 34 play a significant part in the case of positioning and removing the ring 10 from groove 16. Split rings ordinarily are provided with small holes proximate their free ends adapted to receive the pointed noses of special pliers or similar tools for forcing the ends together. However, in many instances when the ring is placed in its cooperating groove the holes are partly or wholly within the inner periphery of the groove and thus obscured from view and difficult to locate and grip with ring removal tools. A general solution to this problem has been to provide inwardly directed perforated lugs at the ring ends to facilitate securement by the special pointed-nose pliers. As may be observed, however, these lugs protrude into the bore of the housing thereby either interferring with the shaft or providing a non-uniform seating surface depth. See, for example, U.S. Patent Nos. Re. 18,144 and 2,861,824.

The slots 34 of the present invention obviate the above problems by providing a surface readily engageable by many varieties of common pliers. As the ring ends are brought together, the slot portions 34 are withdrawn from the groove 16, thus permitting the pliers to slide more freely into slots 34 ensuring a firm grip of the ring.

FIGURE 2 shows another embodiment of the present invention wherein the members 22a and 24a forming the upper portion of ring 10 have the configuration of an inwardly directed spiral. The radius of the spiral for both members 22a and 24a emanates at true center 20. The greatest radii of the spiral being generally equal to radius $R_1$ and located at the point where the members 22a and 24a are joined to the lower circular portion 18. From this juncture the radii of the spirals progressively decrease. It is evident that the free ends of the ring in unrestrained condition are the portions of the ring closest to the true center 20. Thus, when the ends are forced together, the ring takes the substantially circular configuration shown in FIGURE 3, with all of the attendant advantages of the invention as discussed hereinbefore.

Although the preferred embodiments of the invention have been described and illustrated hereinabove, it is readily apparent that certain modifications, changes and adaptations may be made in the disclosed structure and it is hereby intended to cover all such modifications, changes, adaptations and constructions which fall within the scope of the appended claims.

What is claimed is:

1. Securing means for locating or limiting axial movement of a part relative to a housing having a bore comprising:

a one piece open-ended resilient ring having a radial width being substantially uniform through its entire arcuate extent and an axial thickness being substantially uniform through said radial width;

the ring including an intermediate portion having a substantially uniform radius from a geometric center; and two spaced-apart opposite end portions being integrally connected to the intermediate portion, each end portion having an outer peripheral seating surface and having at least an arcuate portion thereof having a radial dimension from the geometric center of the ring to said outer peripheral seating surface which is less than the radius of curvature of the intermediate portion about the geometric center of the ring so that said arcuate portion defines a greater curvature along said outer peripheral seating surface about said geometric center than the intermediate portion, said end portions having means adapted to be engaged by a tool for emplacing and disengaging the securing means.

2. The resilient ring of claim 1 wherein: each of the spaced-apart end portions has the configuration of a spiral.

3. Securing means as defined in claim 1 wherein said means adapted to be engaged by a tool for emplacing and disengaging the securing means are apertures.

4. Securing means as defined in claim 3 wherein said apertures are slots, the slots extending inwardly from the securing means inner periphery and within the radial width proximate the ends of said end portions.

5. Securing means as defined in claim 4 wherein said slots extend completely through the axial thickness of the securing means.

References Cited

UNITED STATES PATENTS

| | | | |
|---|---|---|---|
| 2,509,081 | 5/1950 | Bluth et al. | 85—8.8 |
| 2,595,787 | 5/1952 | Heimann | 85—8.8 |
| 2,883,899 | 4/1959 | Bluth | 85—8.8 |

CARL W. TOMLIN, Primary Examiner

R. S. BRITTS, Assistant Examiner